United States Patent
Landers et al.

(10) Patent No.: US 12,181,489 B2
(45) Date of Patent: Dec. 31, 2024

(54) ACCURACY CHECK METHODOLOGY FOR AN AIR DATA PROBE SYSTEM

(71) Applicant: Gulfstream Aerospace Corporation, Savannah, GA (US)

(72) Inventors: Thomas Landers, Savannah, GA (US); Michael Malluck, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 282 days.

(21) Appl. No.: 17/662,594

(22) Filed: May 9, 2022

(65) Prior Publication Data
US 2023/0358779 A1  Nov. 9, 2023

(51) Int. Cl.
| | |
|---|---|
| G01P 5/16 | (2006.01) |
| B64C 13/50 | (2006.01) |
| B64D 43/02 | (2006.01) |
| B64D 45/00 | (2006.01) |
| G01C 21/16 | (2006.01) |
| G01P 3/00 | (2006.01) |
| G01S 19/13 | (2010.01) |

(52) U.S. Cl.
CPC .............. *G01P 5/16* (2013.01); *B64C 13/503* (2013.01); *B64D 43/02* (2013.01); *B64D 45/00* (2013.01); *G01C 21/16* (2013.01); *G01P 3/00* (2013.01); *G01S 19/13* (2013.01)

(58) Field of Classification Search
CPC . G01P 5/16; G01P 3/00; B64C 13/503; B64D 43/02; B64D 45/00; G01C 21/16; G01S 19/13
See application file for complete search history.

(56) References Cited

U.S. PATENT DOCUMENTS

| | | | | |
|---|---|---|---|---|
| 6,205,376 | B1 * | 3/2001 | Gordon | ..................... G01P 5/16 701/4 |
| 9,128,109 | B1 * | 9/2015 | O'Neill | ..................... G01P 5/00 |
| 2009/0299554 | A1 | 12/2009 | Freissinet | |
| 2013/0311006 | A1 * | 11/2013 | Ahmad | ................ G05D 1/0077 701/3 |

(Continued)

FOREIGN PATENT DOCUMENTS

EP    2833152 A1    2/2015

*Primary Examiner* — Anne Marie Antonucci
*Assistant Examiner* — Luis G Del Valle
(74) *Attorney, Agent, or Firm* — Lorenz & Kopf, LLP

(57) ABSTRACT

A method of checking accuracy of an air data probe system onboard a vehicle is disclosed. An embodiment of the method involves: calculating airspeed measurements from air data provided by the probe system; calculating vehicle speed measurements based on sensor data collected from at least one sensor system onboard the vehicle, wherein the vehicle speed measurements are distinct and independent of the airspeed measurements, and the vehicle speed measurements are calculated without using the air data; comparing a calculated airspeed measurement against a calculated vehicle speed measurement to obtain a speed difference, wherein the calculated airspeed measurement and the calculated vehicle speed measurement correspond to a measurement time during which the vehicle is moving forward; and initiating at least one corrective action onboard the vehicle when magnitude of the speed difference exceeds a threshold value.

20 Claims, 5 Drawing Sheets

(56) References Cited

U.S. PATENT DOCUMENTS

| | | | |
|---|---|---|---|
| 2015/0094976 A1* | 4/2015 | Cooper | G01K 7/42 |
| | | | 702/98 |
| 2020/0216190 A1 | 7/2020 | Schwindt | |
| 2020/0318992 A1* | 10/2020 | Giglio | G01D 5/30 |
| 2023/0129329 A1* | 4/2023 | Vivona | G08G 5/003 |
| | | | 701/3 |

* cited by examiner

ACCURACY CHECK METHODOLOGY FOR AN AIR DATA PROBE SYSTEM

TECHNICAL FIELD

Embodiments of the subject matter described herein relate generally to vehicle control systems and their related sensors and instrumentation. More particularly, embodiments of the subject matter relate to an air data probe system suitable for use with aircraft, and to a methodology for checking the accuracy of airspeed measurements provided by the air data probe system.

BACKGROUND

Vehicles such as aircraft utilize onboard sensors, instruments, systems, and/or devices to measure various quantities, parameters, vehicle status data, environmental conditions, and the like. To this end, an aircraft may include an onboard air data probe system having one or sensors (e.g., air data sensors, airspeed probes, pitot tubes) that are configured, positioned, and operated to measure airspeed of the aircraft. A pitot tube includes one or more inlets or openings that are exposed to the airflow outside of the aircraft. A system onboard the aircraft calculates airspeed based on air data (e.g., pressure measurements) provided by the pitot tube.

The air data probe system provides useful and important airspeed data to the aircraft's crew and control systems. Accordingly, the output of the air data probe system should be as accurate and reliable as possible.

Accordingly, it is desirable to have a system and related methodology to monitor and check performance of an air data probe system onboard a vehicle such as an aircraft. Furthermore, other desirable features and characteristics will become apparent from the subsequent detailed description and the appended claims, taken in conjunction with the accompanying drawings and the foregoing technical field and background.

BRIEF SUMMARY

A method of checking accuracy of an air data probe system onboard a vehicle is disclosed. Certain embodiments of the method involve: calculating airspeed measurements from air data provided by the air data probe system; calculating vehicle speed measurements based on sensor data collected from at least one sensor system onboard the vehicle, wherein the vehicle speed measurements are distinct and independent of the airspeed measurements, and the vehicle speed measurements are calculated without using the air data; comparing a calculated airspeed measurement against a calculated vehicle speed measurement to obtain a speed difference, wherein the calculated airspeed measurement and the calculated vehicle speed measurement correspond to a measurement time during which the vehicle is moving forward, and wherein the comparing is performed by at least one computer-implemented system onboard the vehicle; and initiating at least one corrective action onboard the vehicle when magnitude of the speed difference exceeds a threshold value.

Also disclosed is a system suitable for deployment onboard a vehicle. Certain embodiments of the system include: an air data probe coupled to structure of the vehicle such that at least one inlet of the air data probe is exposed to an environment outside the vehicle, the air data probe configured to provide air data; a sensor system onboard the vehicle and configured to provide sensor data; at least one processor; and at least one processor-readable medium associated with the at least one processor. The at least one processor-readable medium stores processor-executable instructions configurable to be executed by the at least one processor to perform a method of checking accuracy of the air data probe, the method involving: calculating airspeed measurements from the air data provided by the air data probe; calculating vehicle speed measurements based on the sensor data provided by the sensor system, wherein the vehicle speed measurements are distinct and independent of the airspeed measurements, and the vehicle speed measurements are calculated without using the air data; comparing a calculated airspeed measurement against a calculated vehicle speed measurement to obtain a speed difference, wherein the calculated airspeed measurement and the calculated vehicle speed measurement correspond to a measurement time during which the vehicle is moving forward; and initiating at least one corrective action onboard the vehicle when magnitude of the speed difference exceeds a threshold value.

Also disclosed is at least one non-transitory machine-readable storage medium having executable instructions stored thereon. The stored instructions are configurable to cause at least one processor to perform a method of checking accuracy of an air data probe system onboard a vehicle, the method involving: calculating airspeed measurements from air data provided by the air data probe system; calculating vehicle speed measurements based on sensor data collected from at least one sensor system onboard the vehicle, wherein the vehicle speed measurements are distinct and independent of the airspeed measurements, and the vehicle speed measurements are calculated without using the air data; comparing a calculated airspeed measurement against a calculated vehicle speed measurement to obtain a speed difference, wherein the calculated airspeed measurement and the calculated vehicle speed measurement correspond to a measurement time during which the vehicle is moving forward, and wherein the comparing is performed by at least one computer-implemented system onboard the vehicle; and initiating at least one corrective action onboard the vehicle when magnitude of the speed difference exceeds a threshold value.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
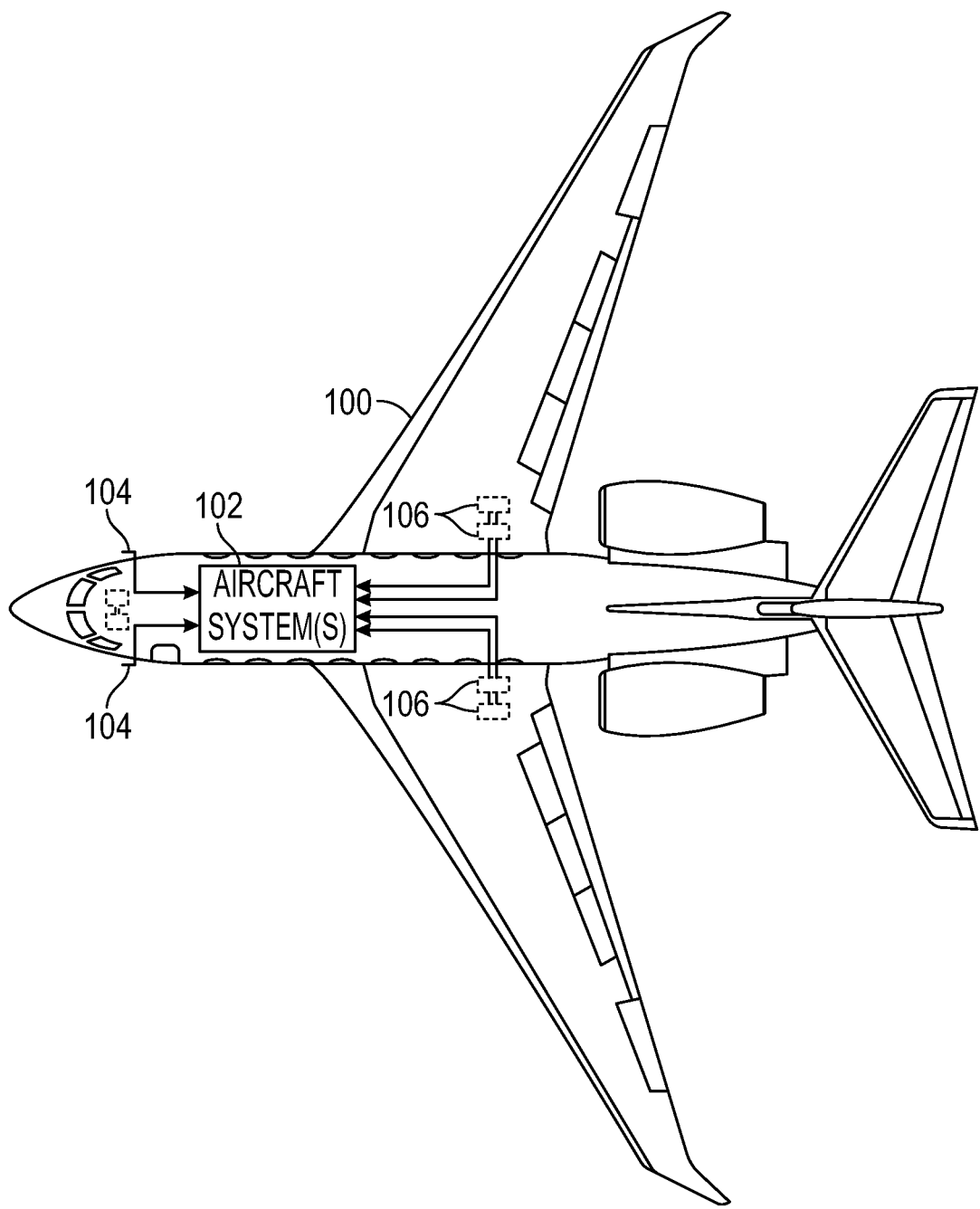
FIG. 1 is a schematic top view representation of an aircraft that is configured in accordance with exemplary embodiments of the invention.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

For the sake of brevity, conventional techniques related to aircraft control and navigation systems, pitot tubes and other types of air data probes, the processing of airspeed and other sensor data onboard an aircraft, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

A vehicle-based system and related operating methodologies are disclosed herein. In accordance with certain non-limiting embodiments, the system is deployed onboard an aircraft such as an airplane. However, it should be appreciated that embodiments of the disclosed system can be utilized for other vehicle applications including, without limitation: trains; helicopters; automobiles; watercraft; submarines; monorails; amusement park rides; transportation systems; spacecraft; or the like.

An air data probe system onboard an aircraft may include one or more pitot tubes having openings or air inlets formed therein. During assembly, maintenance, and/or storage of the aircraft, the pitot tubes are usually covered with a protective sleeve, cover, or sock to inhibit ingress of moisture, contaminants, insects, debris, etc. If an aircraft takes off with the pitot tubes covered, the resulting air data will likely be inaccurate. The disclosed system and methodologies detect conditions that are indicative of covered pitot tubes and, in response to detection of such conditions, take appropriate corrective action or initiate flight crew alerting onboard the aircraft. In certain embodiments, the airspeed reported by the air data probe system is compared against an independently measured or estimated "reference" speed (e.g., wheel speed, an inertially based speed obtained from at least one inertial sensor system onboard the vehicle, or global positioning system (GPS) based speed). If the reference speed exceeds the reported airspeed by a specified amount, then the system assumes that one or more of the pitot tube covers remain installed and that the reported airspeed information may be compromised. Thereafter, the system can initiate at least one form of corrective action onboard the aircraft. In certain embodiments, corrective action can be taken to automatically adjust a parameter, mode, or function of the flight control system in a way that limits, restricts, or inhibits usage of the reported airspeed data.

Referring to the drawings, FIG. 1 is a schematic top view representation of an exemplary embodiment of an aircraft 100 having one or more onboard aircraft systems 102, which may include, without limitation, any of the following in combination and in any number of iterations or multiples: a flight control system; a navigation system; an instrumentation system; a display system; an alerting system; a warning indication system; a messaging or notification system for the flight crew; a GPS; a wheel speed sensor system; and various inertial sensors. FIG. 1 represents the various onboard aircraft systems 102 as a single block, but it should be understood that an embodiment of the aircraft 100 will implement the onboard aircraft systems 102 with a variety of different physical, logical, and computer-implemented components.

In certain embodiments, the onboard aircraft systems 102 include an air data probe system (not separately depicted in FIG. 1) that includes or cooperates with at least one air data probe 104. Although two air data probes 104 are shown in FIG. 1, the aircraft 100 may include more or less than two. Each air data probe 104 can be realized as a smart pitot tube having a plurality of inlet ports corresponding to a plurality of pressure sensors. The air data generated by each air data probe 104 can be processed in an appropriate manner to derive airspeed measurements for the aircraft 100. Pitot tubes, air data systems, their associated operating methods, and their associated air data processing techniques are well known to those familiar with avionics systems and, therefore, will not be described in detail here.

In certain embodiments, the onboard aircraft systems 102 include a groundspeed and/or a wheel speed measurement system that calculates or generates vehicle (aircraft) speed measurements based on sensor data collected from at least one sensor or sensor system onboard the aircraft 100. In accordance with the exemplary embodiment depicted in FIG. 1, these aircraft speed measurements are calculated based on wheel speed data collected from at least one wheel speed sensor associated with at least one wheel 106 of the aircraft 100. The illustrated aircraft 100 has four main wheels 106 (shown in dashed lines because they would otherwise be hidden from view). Each wheel 106 may have one or more wheel speed sensors associated therewith and configured to provide wheel speed data to the appropriate aircraft system 102 onboard the aircraft 100. Accordingly, FIG. 1 shows four data communication paths leading from the four wheels 106 to the aircraft systems 102. As explained in more detail below, the groundspeed and/or wheel speed of the aircraft 100 can be calculated using additional or alternative types of data available onboard the aircraft 100, e.g., inertial sensor data, GPS data, or the like.

Figure 2:
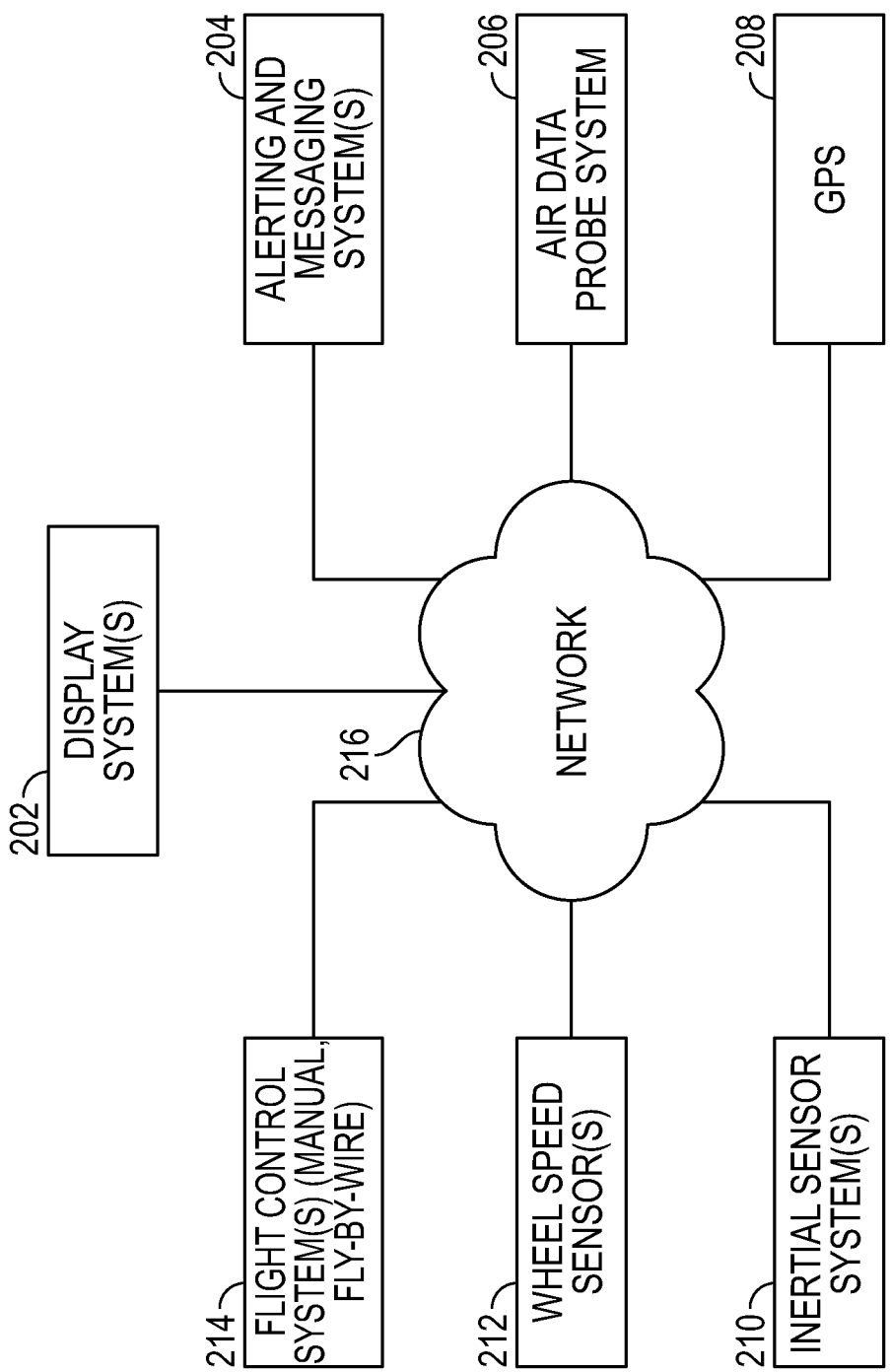
FIG. 2 is a block diagram that depicts various systems and components onboard an aircraft that is configured in accordance with exemplary embodiments of the invention.

FIG. 2 is a block diagram that depicts various systems and components that may be onboard the aircraft 100. Indeed, the onboard aircraft systems 102 shown in FIG. 1 may include any or all of the systems and components depicted in FIG. 2. The illustrated embodiment includes the following systems and components: at least one display system 202; a number of alerting and messaging systems 204; an air data probe system 206; at least one GPS 208; at least one inertial sensor system 210; at least one wheel speed sensor 212; and at least one flight control system 214, e.g., a manual flight control system, a fly-by-wire flight control system, and/or an autonomous flight control system. A deployed implementation of the aircraft 100 may include some or all of these systems and components, additional systems and components (as needed or desired), and/or alternative systems and components (as needed or desired). FIG. 2 is merely an illustrative example that depicts certain systems and components that support the inventive subject matter described herein.

The aircraft 100 includes or cooperates with at least one data communication network 216 that facilitates communication between the various components, systems, and logic onboard the aircraft 100. For example, the data communication network 216 can be utilized to communicate sensor data, measurements, image data, audio data, video data, alerts, messages, flight control commands, and the like. Moreover, the data communication network 216 can be utilized to transfer sensor data from the air data probe system 206, the inertial sensor system(s) 210, and/or the wheel speed sensor(s) 212 to an appropriate processing device or system onboard the aircraft 100.

A display system 202 onboard the aircraft 100 may be realized using any type of conventional display screen, computer monitor, touchscreen component, or other technology that is suitably configured and controlled to display information in the form of text, graphics, icons, images, video content, numerical values, warning indicators, etc. A display system 202 can be implemented as a fixed component located in the cockpit, passenger cabin, and/or elsewhere onboard the aircraft 100. Alternatively or additionally, a display system 202 can be implemented with a mobile or portable device that communicates with the aircraft 100, e.g., a laptop computer, a smartphone, a tablet device, a computer-implemented mobile flight bag, or the like.

An alerting or messaging system 204 onboard the aircraft 100 is configured and controlled in an appropriate manner to generate and communicate (e.g., annunciate audio content, display visual content, play recorded sound, produce haptic feedback, etc.) various alerts, warning messages, notifications, alarms, instructions, and/or reminders, which may be intended for an operator of the aircraft 100, a crew member of the aircraft 100, a passenger onboard the aircraft 100, maintenance personnel, or the like. An alerting or messaging system 204 may include or cooperate with a display system 202 (to display alerts, messages, notifications, etc.), audio system components onboard the aircraft 100, haptic feedback components onboard the aircraft 100, indicator lights or physical hardware indicator elements onboard the aircraft 100, and/or video playback components onboard the aircraft 100. These and other devices, subsystems, or components can be employed to support the generation and presentation of information as needed to support the features and functionality described in more detail herein.

The air data probe system 206 may include any number of distinct air data probes (sensors). As mentioned above, the air data probe system 206 may utilize pitot tubes to provide air data that is used to calculate airspeed measurements. In accordance with certain embodiments, the aircraft 100 has at least one air data probe on the left side and at least one air data probe on the right side. Each air data probe is coupled to structure of the aircraft 100 such that at least one inlet of the air data probe is exposed to the environment outside of the aircraft (the surrounding airspace). During operation of the aircraft 100, each air data probe responds by providing corresponding air data to the air data probe system 206.

The GPS 208 includes a suitably configured GPS receiver onboard the aircraft 100. In accordance with well known GPS technologies and operating methodologies, the GPS 208 receives GPS data from GPS satellites. The received GPS data is processed to obtain geographical location information, navigation information, aircraft velocity, aircraft acceleration, and the like. The design, configuration, and operation of GPS systems are well known and well documented. Accordingly, fundamental and conventional aspects of GPS systems will not be described here.

The aircraft 100 may include or cooperate with at least one inertial sensor system 210 that provides inertial sensor data, wherein aircraft speed measurements are calculated based on the inertial sensor data collected from the inertial sensor system(s) 210. The inertial sensor system(s) 210 are independent of the air data probe system 206, such that the aircraft speed measurements (which are based on the inertial sensor data) are distinct and independent of the airspeed measurements (which are based on the air data obtained from the air data probe system 206). In this regard, the aircraft speed measurements are calculated from the inertial sensor data without using any of the air data from the air data probe system 206. Accordingly, the aircraft speed measurements can serve as a reference for comparison against the airspeed measurements calculated by the air data probe system 206. In certain embodiments, an inertial sensor system 210 may include, cooperate with, or be realized as one or more of the following, without limitation: an inertial measurement unit; a wheel speed sensor; a gyroscope; an accelerometer; a Doppler radar, lidar, or laser. Inertial sensor components may be located in any suitable location onboard the aircraft 100. Moreover, an inertial sensor component can be deployed for devoted use in connection with vehicle speed measurements, or deployed for use with one or more other systems onboard the aircraft 100.

As mentioned above, a wheel speed sensor 212 can be implemented as a type of inertial sensor. FIG. 2 depicts the wheel speed sensor(s) 212 as a separate block because the exemplary embodiment described here calculates the aircraft speed measurements based on wheel speed data collected from at least one wheel speed sensor 212 associated with at least one wheel of the aircraft. Referring again to FIG. 1, each main wheel 106 has at least one associated wheel speed sensor 212, such that the wheel speed of each main wheel 106 can be independently calculated from the respective wheel speed data.

The flight control system(s) 214 regulate the manner in which the aircraft 100 responds to manual, automated, or fly-by-wire commands. Flight control systems are well known to those familiar with modern avionics and aircraft control systems, and need not be described in detail here. At least one flight control system 214 onboard the aircraft 100 supports fly-by-wire operation, which generates electronic control signals in response to pilot interaction with physical flight control devices or features. Fly-by-wire operation can also leverage sensor data and measurement data provided by various onboard systems. As explained in more detail below, the flight control system 214 of the aircraft supports at least two different fly-by-wire modes of operation—including a normal fly-by-wire mode that contemplates available airspeed measurements and an alternate fly-by-wire mode that does not utilize any air data provided by the air data probe system 206. The alternate mode may be characterized as a degraded mode of operation that provides safe but less desirable control of the aircraft.

Figure 3:
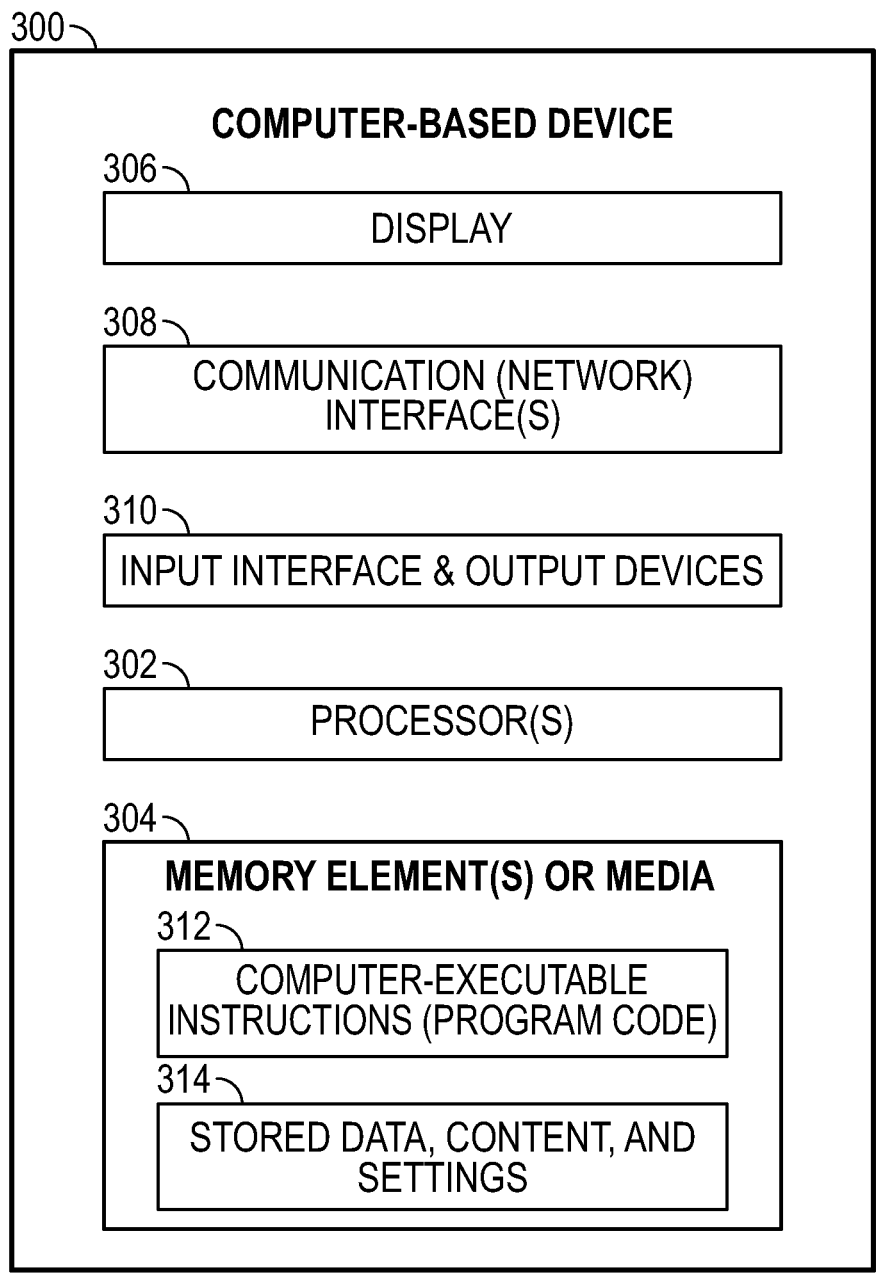
FIG. 3 is a block diagram of an exemplary embodiment of a computer-based device.

In accordance with certain embodiments, the aircraft system(s) 102 depicted in FIG. 1, and one or more of the items depicted in FIG. 2 can be implemented as at least one computer-based or a processor-based device, system, or piece of equipment. In this regard, FIG. 3 is a simplified block diagram representation of an exemplary embodiment of a computer-based device 300, which may be used to implement certain devices or systems onboard the aircraft 100.

The device 300 generally includes, without limitation: at least one processor 302; at least one memory storage device, storage media, or memory element 304; a display 306; at least one communication (network) interface 308; and input and output (I/O) devices 310, such as an input interface, one or more output devices, one or more human/machine interface elements, or the like. In practice, the device 300 can include additional components, elements, and functionality that may be conventional in nature or unrelated to the particular application and methodologies described here.

A processor 302 may be, for example, a central processing unit (CPU), a field programmable gate array (FPGA), a microcontroller, an application specific integrated circuit (ASIC), or any other logic device or combination thereof. One or more memory elements 304 are communicatively coupled to the at least one processor 302, and can be implemented with any combination of volatile and non-volatile memory. The memory element 304 has non-transitory machine-readable and computer-executable instructions (program code) 312 stored thereon, wherein the instructions 312 are configurable to be executed by the at least one processor 302 as needed. When executed by the at least one processor 302, the instructions 312 cause the at least one processor 302 to perform the associated tasks, processes, and operations defined by the instructions 312. Of course, the memory element 304 may also include instructions associated with a file system of the host device 300 and instructions associated with other applications or programs. Moreover, the memory element 304 can serve as a data storage unit for the host device 300. For example, the memory element 304 can provide storage 314 for aircraft data, navigation data, sensor data, measurements, image and/or video content, settings or configuration data for the aircraft, and the like.

The display 306 (if deployed with the particular embodiment of the device 300) may be integrated with the device 300 or communicatively coupled to the device 300 as a peripheral or accessory component. The shape, size, resolution, and technology of the display 306 will be appropriate to the particular implementation of the device 300. The display 306 can be realized as a monitor, touchscreen, or another conventional electronic display that is capable of graphically presenting data and/or information provided by the device 300.

The communication interface 308 represents the hardware, software, and processing logic that enables the device 300 to support data communication with other devices. In practice, the communication interface 308 can be suitably configured to support wireless and/or wired data communication protocols as appropriate to the particular embodiment. For example, the communication interface 308 can be designed to support a cellular communication protocol, a short-range wireless protocol (such as the BLUETOOTH communication protocol), and/or a WLAN protocol. As another example, if the device 300 is a desktop or laptop computer, then the communication interface can be designed to support the BLUETOOTH communication protocol, a WLAN protocol, and a LAN communication protocol (e.g., Ethernet). In accordance with certain aircraft applications, the communication interface 308 is designed and configured to support one or more onboard network protocols used for the communication of information between devices, components, and subsystems of the aircraft 100.

The I/O devices 310 enable the user of the device 300 to interact with the device 300 as needed. In practice, the I/O devices 310 may include, without limitation: an input interface to receive data for handling by the device 300; a speaker, an audio transducer, or other audio feedback component; a haptic feedback device; a microphone; a mouse or other pointing device; a touchscreen or touchpad device; a keyboard; a joystick; a biometric sensor or reader (such as a fingerprint reader, a retina or iris scanner, a palm print or palm vein reader, etc.); a camera; a lidar sensor; or any conventional peripheral device. In this context, a touchscreen display 306 can be categorized as an I/O device 310. Moreover, a touchscreen display 306 may incorporate or be controlled to function as a fingerprint or palm print scanner. A haptic feedback device can be controlled to generate a variable amount of tactile or physical feedback, such as vibrations, a force, knock, or bump sensation, a detectable movement, or the like. Haptic feedback devices and related control schemes are well known and, therefore, will not be described in detail here.

The subject matter presented here relates to a diagnostic check that can be performed onboard a vehicle to verify proper operation of an air data probe system. More specifically, the methodology presented here checks the accuracy of airspeed measurements obtained from the air data probe system against vehicle speed measurements obtained from a different onboard system, which is considered to be a baseline or reference system. If the airspeed measurements are not consistent with the referenced vehicle speed measurements, then one or more corrective actions can be taken to address the situation. In this regard, FIG. 4 is a flow chart that illustrates an exemplary embodiment of an air data probe accuracy check process 400, and FIG. 5 is a flow chart that illustrates an exemplary embodiment of a corrective action process 500 (which may be triggered by the process 400).

The various tasks performed in connection with a described process may be performed by software, hardware, firmware, or any combination thereof. In practice, portions of a disclosed process may be performed by different elements of the described system, e.g., a sensor or a probe, an onboard control system, a computer or processor based component, or the like. It should be appreciated that an illustrated process may include any number of additional or alternative tasks, the tasks shown in FIG. 4 and FIG. 5 need not be performed in the illustrated order, and a disclosed process may be incorporated into a more comprehensive procedure or process having additional functionality not described in detail herein. Moreover, one or more of the depicted tasks could be omitted from an embodiment of a disclosed process as long as the intended overall functionality remains intact.

The following description relates to the exemplary deployment mentioned above, wherein the vehicle is an aircraft outfitted with an air data probe system (having one or more air data probes, e.g., pitot tubes) and a wheel speed measurement system (having one or more wheel speed sensors). The following description assumes that the wheel speed measurement system has been calibrated and is operating in a normal and expected manner to allow it to produce accurate wheel speed information.

Figure 4:
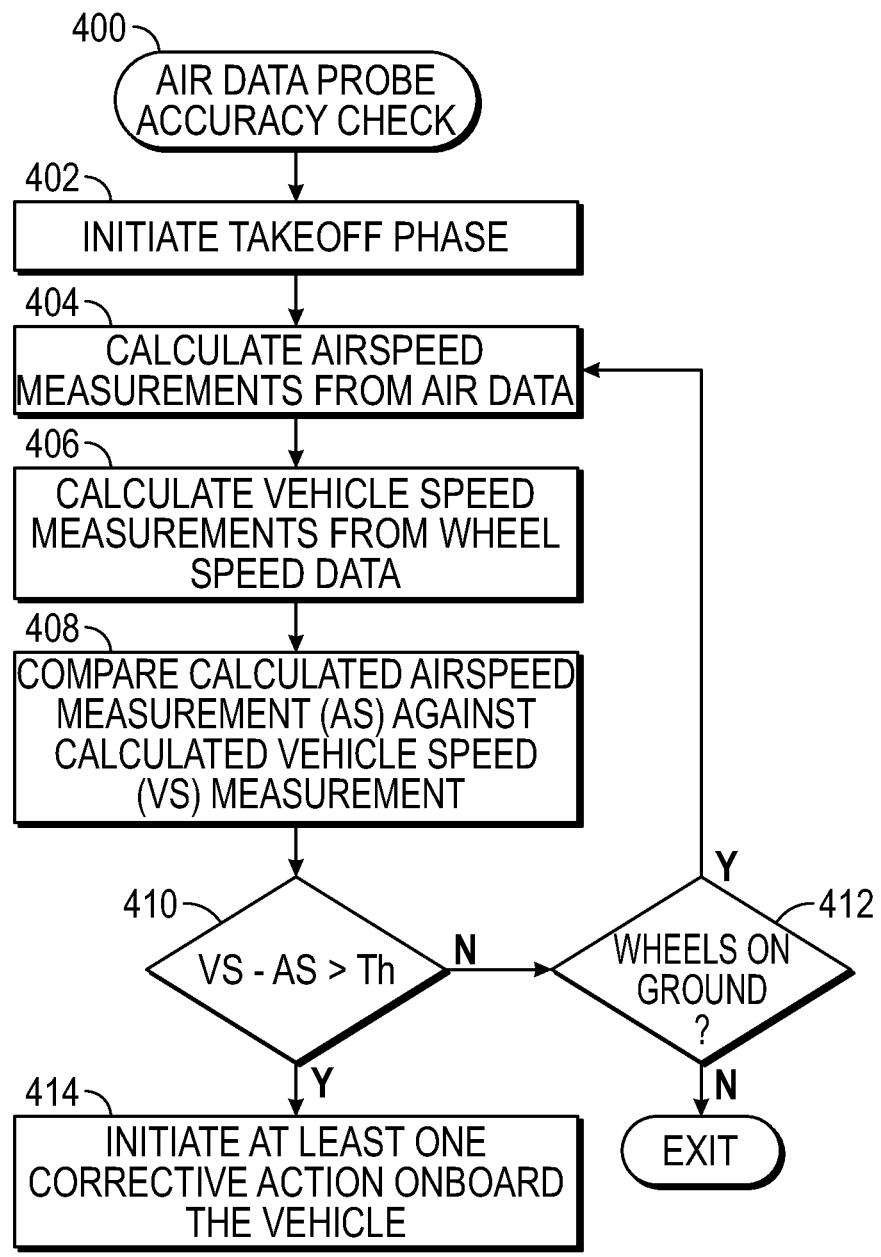
FIG. 4 is a flow chart that illustrates an exemplary embodiment of an air data probe accuracy check process.
Figure 5:
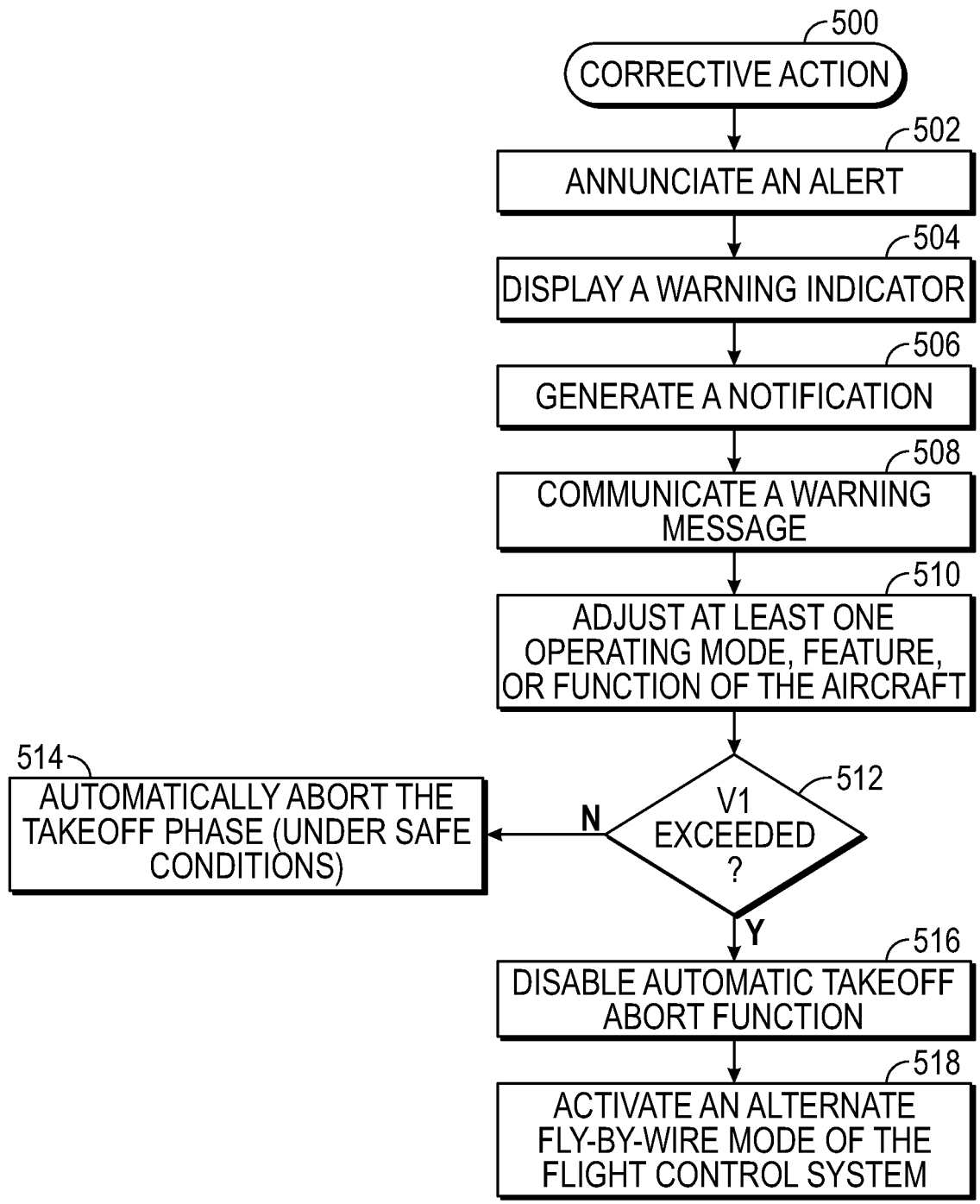
FIG. 5 is a flow chart that illustrates an exemplary embodiment of a corrective action process.

Referring to FIG. 4, the process 400 may begin with the initiation of a takeoff phase of the aircraft (task 402), during which the aircraft is moving forward with its wheels in contact with the ground. In practice, the process 400 may remain inactive or disabled under certain conditions or until certain criteria has been met. For example, the process 400 may be disabled while the aircraft is taxiing and/or while the aircraft is being towed. As another example, the process 400 may begin only after the aircraft has reached a minimum ground speed (such as 25-30 knots), to increase the accuracy of the output of the air data probes. As another example, the process 400 may be terminated or deactivated some time after takeoff (when the wheels are no longer in contact with the ground and the wheel speed measurements are no longer indicative of the aircraft ground speed). Alternative or additional criteria may be considered, as appropriate for the particular implementation and deployment of the various aircraft systems onboard the aircraft.

During the takeoff phase and while the aircraft wheels remain in ground contact, the process 400 calculates airspeed measurements from air data provided by the air data probe system (task 404). In certain implementations, the system utilizes weight-on-wheel sensors to determine whether the wheels are in contact with the ground. The airspeed measurements (which are usually expressed in knots) are calculated from pressure readings obtained from the air data probes, wherein the pressure readings are indicative of the airspeed of the aircraft. If multiple air data probes are deployed on the aircraft, task 404 may calculate a plurality of airspeed measurements (one for each probe) corresponding to each measurement time. Also during the takeoff phase and while the aircraft wheels remain in ground contact, the process 400 calculates vehicle speed measurements based on sensor data collected from at least one sensor system onboard the vehicle, such as a wheel speed system having at least one wheel speed sensor, an inertial sensor system having at least one inertial sensor that provides inertial sensor data, or the like. The exemplary embodiment described here calculates the vehicle speed measurements from wheel speed data collected from at least one wheel speed sensor associated with at least one wheel of the aircraft (task 406). Such vehicle speed measurements may be calculated from an average wheel speed value, a weighted wheel speed value, or a selected wheel speed value (e.g., the lowest measured wheel speed taken from a plurality of wheel speed sensors). Alternatively or additionally, the vehicle speed measurements can be calculated based on inertial sensor data provided by at least one inertial sensor system.

The process 400 continues by comparing at least one calculated airspeed measurement against at least one calculated vehicle speed measurement (task 408). As mentioned previously, the calculated airspeed measurements and the calculated vehicle speed measurements correspond to respective measurement times during which the aircraft is moving forward (e.g., during the takeoff phase). For the example presented here, each calculated airspeed measurement is associated with a particular airspeed measurement time or period of time, and each calculated vehicle speed measurement is associated with a particular vehicle speed measurement time or period of time. During task 408, the calculated airspeed and vehicle speed measurements have corresponding or synchronized measurement times or time periods. In accordance with the exemplary embodiment presented here, the process 400 compares the calculated airspeed and vehicle speed measurements to obtain a speed difference, and checks whether the magnitude of the speed difference exceeds a specified threshold value. For this example, the process 400 obtains the speed difference between the calculated vehicle speed and the calculated airspeed for a given measurement time or over a very brief period of measurement time, and checks whether that speed difference is greater than the threshold value (query task 410). In certain non-limiting embodiments, the threshold speed value is 30 knots. The threshold value may be variable or it can be selected to be something other than 30 knots, as appropriate for the particular vehicle application, system implementation, and/or vehicle configuration.

If the difference between the calculated vehicle speed measurement and the calculated airspeed measurement does not exceed the stated threshold value (the "No" branch of query task 410), then the process 400 declares or determines that the air data from the air data probe system is accurate and reliable, and the takeoff phase may continue as usual. To this end, the process 400 may check whether the aircraft wheels remain on the ground (query task 412) and/or whether the aircraft has become airborne. If the process 400 determines that the wheels are no longer on the ground (the "No" branch of query task 412), then the process 400 can exit. If the wheels remain on the ground (the "Yes" branch of query task 412), then the process 400 can return to task 404 and continue in the manner described above. The system may also check that the aircraft (e.g., the wheels) has been on the ground for more than a specific period of time, such as 60 seconds, before re-enabling the process 400. This ensures that the process 400 does not execute during landing.

If the calculated vehicle speed is higher than the calculated airspeed by an amount that exceeds the threshold value (the "Yes" branch of query task 410), then the process 400 declares or determines that the air data from the air data probe system may be inaccurate or reading lower than expected, and initiates at least one corrective action onboard the aircraft (task 414). The process 400 may apply a short persistence value for the determination made at query task 410, to reduce the likelihood of false triggers and to disregard "glitchy" or "noisy" readings. As mentioned above, calculated airspeed measurements that are significantly lower than the calculated vehicle speed measurements (which are assumed to be of reference quality for purposes of this description) are an indication that at least one of the air data probes might be covered, partially blocked, or obstructed. In such a scenario, calculated airspeed measurements will be lower (relative to normal measurements) and calculated altitude measurements may be higher (relative to normal measurements). Accordingly, the corrective action(s) initiated by the process 400 are intended to address a potentially blocked air data probe.

Referring to FIG. 5, the process 500 depicts a number of corrective actions that can be initiated by task 414 of the process 400. It should be appreciated that any one or more of the corrective actions shown in FIG. 5 can be taken (alone or in any combination). Furthermore, an embodiment of the process 500 may include any number of additional or alternative corrective actions, as appropriate to the particular deployment—the specific corrective actions shown in FIG. 5 and described herein are not intended to be exhaustive or limiting in any way.

One type of corrective action involves annunciating an alert onboard the vehicle (aircraft) and/or elsewhere (task 502). In accordance with the exemplary scenario contemplated here, task 502 annunciates an alert regarding a potentially covered or blocked air data probe of the air data probe system. An alert of this type may be annunciated as any of the following, without limitation: an audio message including human speech; an indicator sound, signal, or audio pattern; a visible indicator light, color, flag, or flashing pattern; display of text indicating the nature of the alert; or haptic feedback. Another type of corrective action involves displaying an indicator onboard the vehicle (aircraft) and/or elsewhere (task 504). In accordance with the exemplary scenario contemplated here, task 504 displays an indicator regarding a potentially covered or blocked air data probe of the air data probe system. An indicator of this type may include any of the following, without limitation: a displayed icon, text, color, shape, or graphic; an illuminated light or lamp having a distinguishable color, flashing pattern, intensity, or visible characteristic; or a mechanically actuated hardware component or device, such as a flag, a button, or sign.

Another type of corrective action involves generating a notification that is intended for an operator and/or crew member of the vehicle (aircraft) (task 506). In accordance with the exemplary scenario contemplated here, task 506 generates a notification regarding a potentially covered or blocked air data probe of the air data probe system. A notification of this type may include any of the following, without limitation: a pop-up notification on a display panel or monitor onboard the vehicle; a notification delivered to a mobile device, smartphone, laptop or tablet computer, or wearable electronic device; or a notification displayed on an instrument panel or control panel of the vehicle.

Another type of corrective action involves communicating a warning message that is intended for an operator and/or crew member of the vehicle (aircraft) (task 508). In accordance with the exemplary scenario contemplated here, task 508 communicates a warning message regarding a potentially covered or blocked air data probe of the air data probe system. A warning message of this type may include any of the following, without limitation: a pop-up message on a display panel or monitor onboard the vehicle; a text message or email delivered to a mobile device, smartphone, laptop or tablet computer, or wearable electronic device; or a written message displayed on an instrument panel or control panel of the vehicle.

Another type of corrective action involves adjusting at least one operating mode, feature, or function of the vehicle (aircraft), if appropriate and as needed (task 510). For example, task 510 may involve the adjustment, tuning, modification, or configuration of a flight control system of the aircraft. As another example, task 510 may involve the adjustment, tuning, modification, or configuration of a navigation system of the aircraft. As yet another example, task 510 may cause one or more of the aircraft systems to limit, restrict, or inhibit the use of at least some of the air data (provided by the air data probe system) going forward. The display system may also substitute the indicated air data parameters with an alternative source, such as inertial data, in order to give the pilot the most accurate information available.

Another type of corrective action involves automatically aborting the takeoff phase when current flight conditions allow safe aborting of the takeoff phase. To this end, the process 500 may check whether the aircraft's takeoff decision speed has been exceeded, using some data source other than air data (query task 512). The takeoff decision speed is commonly known as the V1 speed. Ideally, the process 500 can detect the presence of a covered air data probe early in the takeoff phase, and well before V1 has been reached, such that the takeoff phase can be manually or automatically aborted in a safe, effective, and efficient manner. If V1 has not been exceeded (the "No" branch of query task 512), then automatically aborting the takeoff phase may proceed under safe operating conditions (task 514). If V1 has been exceeded (the "Yes" branch of query task 512), then the automatic takeoff abort function can be disabled (task 516).

Another type of corrective action applies to aircraft that incorporate fly-by-wire flight controls. More specifically, the process 500 may activate an alternate fly-by-wire mode of the flight control system, wherein the alternate mode does not utilize any air data that is subsequently provided by the air data probe system (task 518). Alternatively, task 518 may activate an alternate fly-by-wire mode that selectively utilizes only a portion of the air data that has been deemed to be accurate and reliable. For example, if only one of four air data probes is determined to be blocked or covered, then task 518 may activate an alternate fly-by-wire mode that still leverages the air data from the remaining three air data probes, while possibly disregarding the air data from the covered air data probe. For the sake of clarity and ease of description, adjustment of the fly-by-wire mode is depicted as a separate task in FIG. 5. It should be appreciated that such adjustment may be contemplated by the adjustment described above for task 510.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of checking accuracy of an air data probe system onboard an aircraft having a flight control system that supports fly-by-wire operation, the method comprising:
calculating airspeed measurements from air data provided by the air data probe system;
calculating vehicle speed measurements based on sensor data collected from at least one sensor system onboard the aircraft, wherein the vehicle speed measurements are distinct and independent of the airspeed measurements, and the vehicle speed measurements are calculated without using the air data;
comparing a calculated airspeed measurement against a calculated vehicle speed measurement to obtain a speed difference, wherein the calculated airspeed measurement and the calculated vehicle speed measurement correspond to a measurement time during which the aircraft is moving forward, and wherein the comparing is performed by at least one computer-implemented system onboard the vehicle; and initiating at least one corrective action onboard the vehicle when magnitude of the speed difference exceeds a threshold value, wherein the at least one corrective action comprises activating an alternate fly-by-wire mode of the flight control system.

2. The method of claim 1, wherein the at least one corrective action further comprises:
annunciating an alert;
displaying a warning indicator;
generating a notification intended for an operator of the aircraft or a crew member of the aircraft; or
communicating a warning message intended for an operator of the aircraft or a crew member of the aircraft.

3. The method of claim 1, wherein:
the alternate fly-by-wire mode of the flight control system does not utilize any air data subsequently provided by the air data probe system.

4. The method of claim 1, wherein:
the measurement time occurs during a takeoff phase of the aircraft; and
the at least one corrective action comprises automatically aborting the takeoff phase when current flight conditions allow safe aborting of the takeoff phase.

5. The method of claim 1, wherein:
the initiating step is performed when the calculated airspeed measurement is less than the calculated aircraft speed measurement by an amount that exceeds the threshold value.

6. The method of claim 5, wherein the at least one corrective action comprises:
annunciating an alert regarding a potentially covered or blocked air data probe of the air data probe system;
displaying a warning indicator regarding a potentially covered or blocked air data probe of the air data probe system;
generating a notification intended for an operator of the aircraft or a crew member of the aircraft, the notification regarding a potentially covered or blocked air data probe of the air data probe system; or
communicating a warning message intended for an operator of the aircraft or a crew member of the aircraft, the warning message regarding a potentially covered or blocked air data probe of the air data probe system.

7. The method of claim 1, wherein the vehicle speed measurements are calculated based on inertial sensor data collected from at least one inertial sensor system onboard the aircraft.

8. The method of claim 1, wherein the vehicle speed measurements are calculated based on wheel speed data collected from at least one wheel speed sensor associated with at least one wheel of the aircraft.

9. The method of claim 8, wherein:
the measurement time occurs during a takeoff phase of the aircraft, and while the at least one wheel remains in ground contact.

10. A system onboard an aircraft having a flight control system that supports fly-by-wire operation, the system comprising:
an air data probe coupled to structure of the aircraft such that at least one inlet of the air data probe is exposed to an environment outside the aircraft, the air data probe configured to provide air data;
a sensor system onboard the aircraft and configured to provide sensor data;
at least one processor; and
at least one processor-readable medium associated with the at least one processor, the at least one processor-readable medium storing processor-executable instructions configurable to be executed by the at least one processor to perform a method of checking accuracy of the air data probe, the method comprising:
calculating airspeed measurements from the air data provided by the air data probe;
calculating vehicle speed measurements based on the sensor data provided by the sensor system, wherein the vehicle speed measurements are distinct and independent of the airspeed measurements, and the vehicle speed measurements are calculated without using the air data;
comparing a calculated airspeed measurement against a calculated vehicle speed measurement to obtain a speed difference, wherein the calculated airspeed measurement and the calculated vehicle speed measurement correspond to a measurement time during which the aircraft is moving forward; and
initiating at least one corrective action onboard the aircraft when magnitude of the speed difference exceeds a threshold value, wherein the at least one corrective action comprises activating an alternate fly-by-wire mode of the flight control system.

11. The system of claim 10, wherein the at least one corrective action comprises:
annunciating an alert regarding possible coverage or blockage of the air data probe;
displaying a warning indicator regarding possible coverage or blockage of the air data probe;
generating a notification intended for an operator of the aircraft or a crew member of the aircraft, the notification regarding possible coverage or blockage of the air data probe; or
communicating a warning message intended for an operator of the aircraft or a crew member of the aircraft, the warning message regarding possible coverage or blockage of the air data probe.

12. The system of claim 10, wherein:
the alternate fly-by-wire mode of the flight control system does not utilize any air data subsequently provided by the air data probe.

13. The system of claim 10, wherein:
the measurement time occurs during a takeoff phase of the aircraft; and
the at least one corrective action additionally comprises automatically aborting the takeoff phase when current flight conditions allow safe aborting of the takeoff phase.

14. The system of claim 10, wherein:
the initiating step is performed when the calculated airspeed measurement is less than the calculated vehicle speed measurement by an amount that exceeds the threshold value.

15. The system of claim 10, wherein:
the sensor system comprises an inertial sensor system;
the sensor data comprises inertial sensor data provided by the inertial sensor system; and
the vehicle speed measurements are calculated based on the inertial sensor data.

16. The system of claim 10, wherein:
the sensor system comprises at least one wheel speed sensor associated with at least one wheel of the aircraft;
the sensor data comprises wheel speed data provided by the at least one wheel speed sensor; and
the vehicle speed measurements are calculated based on the wheel speed data.

17. At least one non-transitory machine-readable storage medium having executable instructions stored thereon, the instructions configurable to cause at least one processor to perform a method of checking accuracy of an air data probe system onboard an aircraft, the method comprising:
calculating airspeed measurements from air data provided by the air data probe system;
calculating vehicle speed measurements based on sensor data collected from at least one sensor system onboard the aircraft, wherein the vehicle speed measurements are distinct and independent of the airspeed measurements, and the vehicle speed measurements are calculated without using the air data;
comparing a calculated airspeed measurement against a calculated vehicle speed measurement to obtain a speed difference, wherein the calculated airspeed measurement and the calculated vehicle speed measurement correspond to a measurement time during which the aircraft is moving forward, and wherein the comparing is performed by at least one computer-implemented system onboard the aircraft; and
initiating at least one corrective action onboard the aircraft when magnitude of the speed difference exceeds a threshold value, wherein the at least one corrective action comprises activating an alternate fly-by-wire mode of the flight control system.

18. The at least one non-transitory machine-readable storage medium of claim 17, wherein:
the at least one corrective action comprises activating an alternate fly-by-wire mode of the flight control system that does not utilize any air data subsequently provided by the air data probe.

19. The at least one non-transitory machine-readable storage medium of claim 17, wherein:
the measurement time occurs during a takeoff phase of the aircraft; and
the at least one corrective action comprises automatically aborting the takeoff phase when current flight conditions allow safe aborting of the takeoff phase.

20. The at least one non-transitory machine-readable storage medium of claim 17, wherein:
the sensor system comprises at least one wheel speed sensor associated with at least one wheel of the aircraft;
the sensor data comprises wheel speed data provided by the at least one wheel speed sensor; and
the vehicle speed measurements are calculated based on the wheel speed data.

* * * * *